United States Patent [19]

Livingston

[11] 4,426,097
[45] Jan. 17, 1984

[54] HITCH ADAPTER FOR SINGLE-WHEEL TRAINER

[76] Inventor: C. Glenn Livingston, 114 St. Andrews Ct., Columbia, S.C. 29210

[21] Appl. No.: 349,430

[22] Filed: Feb. 16, 1982

[51] Int. Cl.³ .............................................. B60D 1/06
[52] U.S. Cl. .................................. 280/415 A; 280/78; 280/460 R
[58] Field of Search .................. 280/460 R, 47.32, 78, 280/415 R, 415 A

[56] References Cited

U.S. PATENT DOCUMENTS

| | | | |
|---|---|---|---|
| Re. 20,292 | 3/1937 | Brown | 280/33.4 |
| 2,157,186 | 5/1939 | Pinter, Sr. et al. | 9/2 |
| 2,494,421 | 1/1950 | Wittke | 280/460 R |
| 3,784,230 | 1/1974 | Worrall, Jr. | 280/491 |
| 3,865,404 | 2/1975 | Schwartz | 280/415 A |
| 4,076,264 | 2/1978 | Chatterley | 280/81 A |
| 4,305,602 | 12/1981 | Ungvari et al. | 280/460 R |

Primary Examiner—John A. Pekar
Assistant Examiner—D. Lynn Fugate
Attorney, Agent, or Firm—Flynn, Thiel, Boutell & Tanis

[57] ABSTRACT

A trailer hitch structure for coupling a single-wheel trailer to a tow vehicle having a conventional hitch bar fixed thereto and projecting rearwardly thereof. There is provided a rigid adapter having a rear portion and a front portion fixedly connected to and spaced forwardly from the rear portion. The front portion has structure for snugly and rigidly fixedly coupling the front portion to the vehicle hitch bar. The adapter also has a pair of coupling portions mounted on the rear portion in spaced relationship along a direction which extends transversely relative to the direction of vehicle movement for releasably coupling the trailer to the adapter at a pair of sidewardly spaced locations.

2 Claims, 5 Drawing Figures

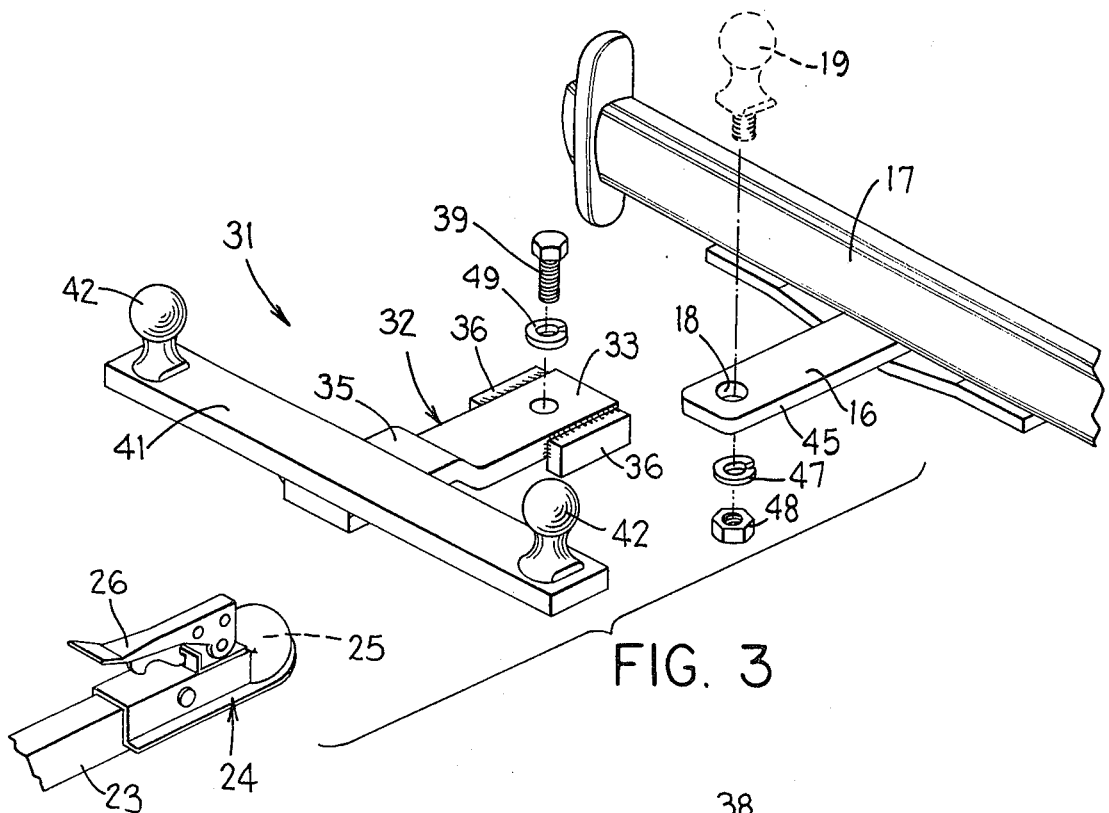
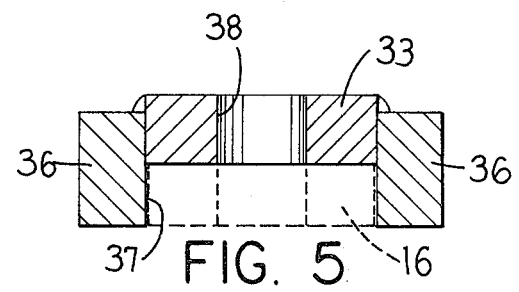
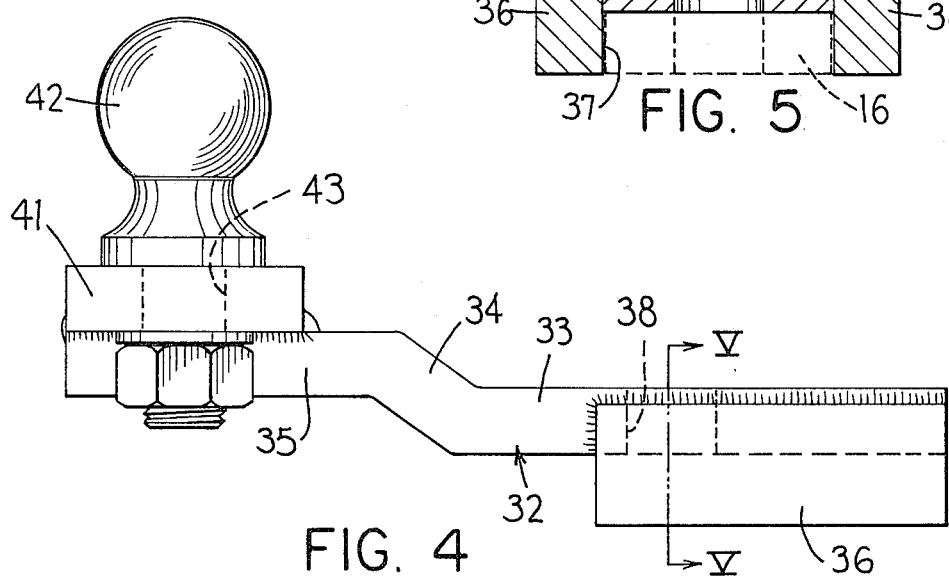

HITCH ADAPTER FOR SINGLE-WHEEL TRAINER

FIELD OF THE INVENTION

This invention relates to a trailer hitch arrangement and, in particular, to an improved hitch adapter for attachment to a vehicle to facilitate the attaching and towing of a single-wheel trailer.

BACKGROUND OF THE INVENTION

As vehicles become smaller due to public demand for increased fuel economy, the space available in said vehicles for storage of goods, such as when traveling a long distance, is substantially reduced. For this reason, it is now quite common to mount various racks and other enclosed carriers on the vehicle roof in order to provide additional storage space when transporting substantial quantities of goods, such as when vacationing. However, such roof-mounted racks and enclosures have numerous recognized disadvantages, such as the difficulty of access and the substantial reduction in fuel economy.

Hence, there is an increasing need for some type of structure which can be provided in conjunction with small vehicles and which can provide additional storage capacity in those situations when needed. Such device is believed already available in the form of a one-wheel trailer, such trailers having been known for a long period of time. A one-wheel trailer has recognized advantages in that the driver of the vehicle does not have to worry about maneuvering of the trailer, such as when backing up, and hence such trailer in many instances is an ideal structure for providing additional storage capacity. Further, such trailers can be extremely light in weight so as to not impose any significant drag on the vehicle, and provide convenient access to the storage space therein.

While such single-wheel trailers have been known for a long time, nevertheless such trailers have never been extensively accepted or utilized, and it is believed that this is due primarily to the highly specialized and complex hitch arrangement required for connecting such trailer to a vehicle. For example, most single-wheel trailers employ a single or double tongue arrangement having a pair of clamping devices which are fixedly clamped directly to the bumper at spaced locations therealong, whereby the two clamping devices and their connections to the vehicle bumper hence provide the necessary stabilization for the trailer. Such an arrangement is illustrated by U.S. Pat. Nos. 3,784,230 and 2,157,186. The use of such bumper attachments is undesirable for numerous reasons. For example, the bumpers on most vehicles lack the strength necessary for permitting the clamping devices to be directly attached thereto, and hence do not have the necessary strength to properly withstand the towing forces being imposed directly thereon. Further, many bumpers are an intricate part of the styling of the vehicle, and hence are painted or formed of or coated with plastic, and hence are easily damaged if clamping devices are mounted thereon. Further, the bumpers of the many different vehicles have many different configurations and sizes, and thus providing the trailer tongue with brackets thereon capable of fitting such a wide range of bumper configurations is substantially impossible. Further, some bumpers are designed such that it is virtually impossible to mount a clamp directly thereon. Hence, the use of single-wheel trailers, particularly the known type trailers employing a pair of bumper clamps, is hence wholly impractical based on an evaluation of the bumper construction of most modern vehicles.

Accordingly, the present invention relates to an improved trailer hitch arrangement designed specifically for a single-wheel trailer, which hitch arrangement overcomes the disadvantages associated with prior known structures as described above, and hence makes use of such single-wheel trailers a highly desirable and in fact practical alternative with modern vehicles, including small vehicles.

In the present invention, there is provided an improved hitch arrangement which makes use of the standard trailer hitch (such as a Class I hitch) commonly present on many vehicles, which standard hitch is most instances has the hitch bar attached directly to the frame but in many instances makes use of a special bumper mount. The present invention provides a special hitch adapter which can be easily attached directly to the existing hitch bar on the vehicle. The hitch ball is initially removed, and the hitch adapter is then fixedly attached to the hitch bar by being bolted thereto, which bolt utilizes the hole already existing in the hitch bar. The hitch adapter has a crossbar at the rearward end thereof, which crossbar mounts thereon a pair of couplers, specifically a pair of conventional hitch balls, whereby the one-wheel trailer can then have a double tongue arrangement provided with conventional ball-receiving couplings so as to be connected to a pair of spaced hitch balls. In this manner, the single-wheel trailer can be connected directly to the already-existing hitch bar which is fixedly attached to the vehicle. Hence, the single-wheel trailer can thus be coupled to virtually any vehicle, particularly since many vehicles already have a trailer hitch mounted thereon, and the resulting hitch arrangement provides for vertical motion between the car and the trailer, as necessary for negotiating inclines and the like, but also provides a rigid connection between the car and the trailer so as to prevent horizontal articulation therebetween, whereby the trailer is thus provided with the required stability.

In the improved hitch adapter of this invention, the forward end of the adapter preferably has a channel-shaped configuration so as to snugly accommodate therein the hitch bar as mounted on the vehicle, which channel-shaped configuration hence prevents relative twisting or pivoting between the adapter and the hitch bar in both horizontal and vertical planes, whereby direct bolting of the adapter to the hitch bar thus results in a strong and rigid connection. This adapter is, in the preferred embodiment, T-shaped so as to be provided with a horizontal crossbar at the rearward end of the base leg, which crossbar adjacent the free ends thereof mounts thereon the two hitch balls for cooperation with the hitch couplers on the trailer. The crossbar is normally disposed at an elevation substantially above the front end of the base leg so that the latter is disposed at the elevation required for connection to the hitch bar, whereas the crossbar is at a higher elevation to accommodate the greater height of the trailer tongues associated with one-wheel trailers.

In the improved adapter of this invention, a one-wheel trailer can be easily and efficiently attached to or disconnected from a vehicle without requiring any direct connection to the bumper, and at the same time the hitch adapter provides for an extremely strong and rigid connection to permit solely the necessary vertical articulation between the trailer and vehicle. The hitch adapter is extremely small and compact to facilitate both the handling and storage thereof. The provision of a pair of standard hitch balls on the adapter, and cooperating standard couplers on the trailer, hence greatly facilitates the attachment of the trailer to the vehicle, or the detachment of the trailer from the vehicle when desired.

Other objects and purposes of the invention will be apparent to persons familiar with devices of this general type upon reading the following specification and inspecting the accompanying drawings.

BRIEF DESCRIPTION OF THE DRAWINGS

FIG. 3 is an exploded, fragmentary perspective view illustrating the hitch adapter of this invention and its relationship to a standard trailer hitch bar as mounted on a vehicle.

FIG. 4 is a side elevational view of the hitch adapter.

FIG. 5 is a cross-sectional view taken along line V—V in FIG. 4.

Figure 1:
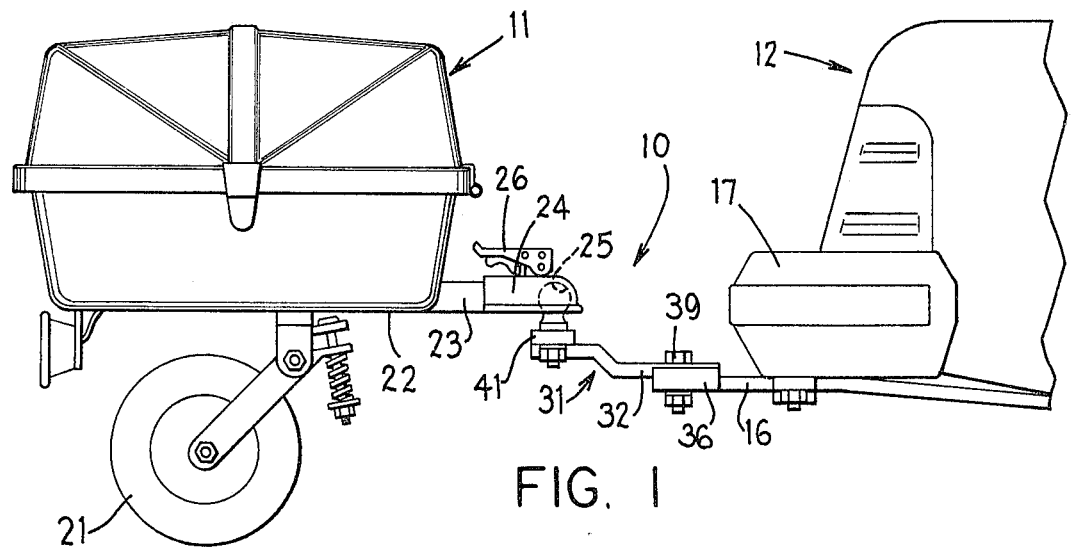
FIG. 1 is a side elevational view which illustrates the attachment of a single-wheel trailer to a vehicle by means of a hitch attachment according to the present invention.

Certain terminology will be used in the following description for convenience in reference only, and will not be limiting. For example, the words "upwardly", "downwardly", "leftwardly" and "rightwardly" will refer to directions in the drawings to which reference made. The word "front" or "forward" end of the hitch adapter will refer to the rightward end in FIGS. 1-4. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Figure 2:
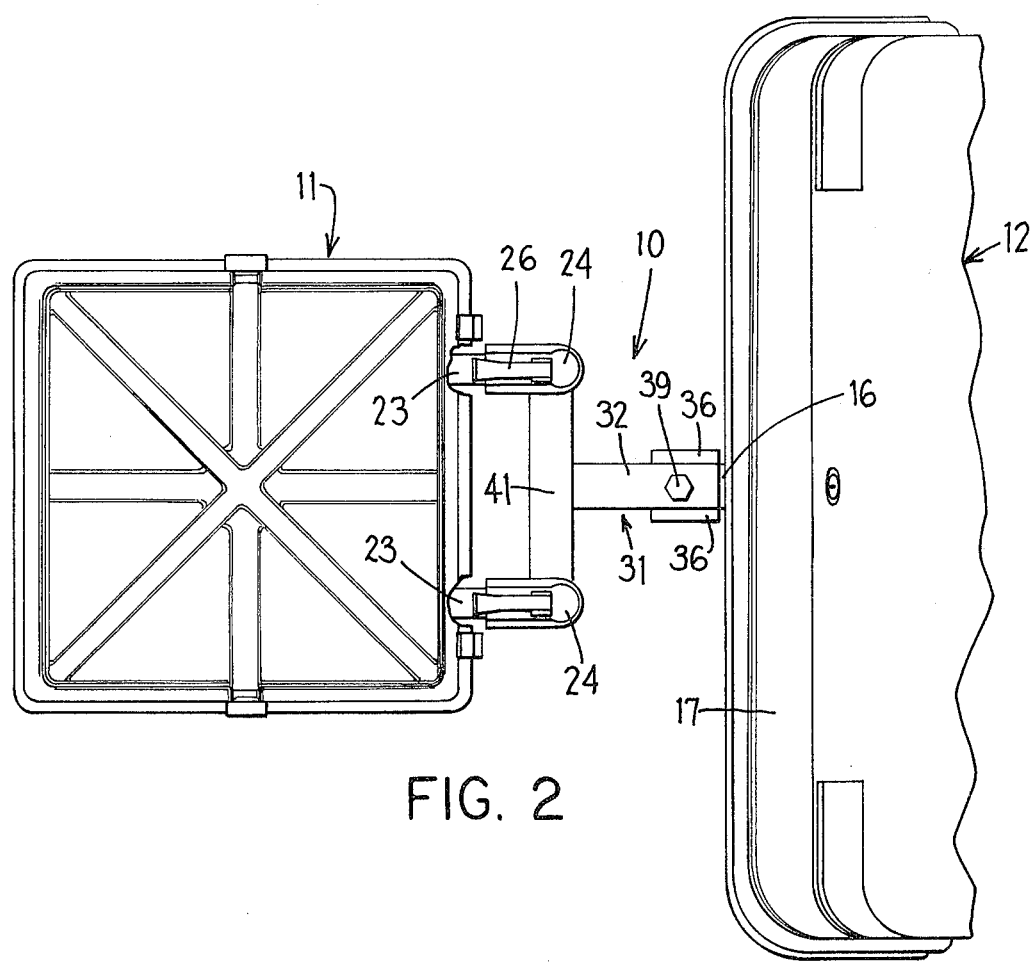
FIG. 2 is a top view illustrating the hitch attachment coupled between the trailer and the vehicle.

FIGS. 1 and 2 illustrate therein a hitch arrangement 10 for coupling a single-wheel trailer 11 to the rear of a vehicle 12, such as an automobile.

As illustrated by FIG. 3, the vehicle 12 has a standard trailer hitch, such as a Class I hitch, mounted thereon. This standard trailer hitch includes a hitch bar 16 which is appropriately fixed to the vehicle, such as by being fixed to the frame or to the bumper in a conventional manner. This hitch bar 16, which is positioned below the rear vehicle bumper 17 and projects rearwardly thereof, has a conventional opening 18 extending therethrough. A standard hitch ball 19, as indicated by dotted lines, is conventionally removably mounted on the hitch bar 16 due to the threaded extension on the ball 19 extending through the opening 18, which threaded extension receives thereon a standard lock washer and nut. This standard hitch, as defined by the bar 16 and ball 19, is well known and extensively utilized on automotive vehicles, so that further description of same is believed unnecessary.

Considering now the single-wheel trailer 11, as illustrated by FIGS. 1 and 2, same includes a single-wheel 21 disposed for rolling engagement with the roadway or ground. This wheel 21 is normally positioned wholly below the bed or frame 22 of the trailer and is supported thereon by a conventional support bar and resilient suspension. The bed or frame 22 of the trailer has, in the illustrated embodiment, a pair of elongated tongues or drawbars 23 projecting forwardly therefrom in parallel but sidewardly spaced relationship. Each of these tongues 23 has a standard coupler 24 associated with the free end thereof, which coupler defines therein a downwardly opening recess 25 for accommodating therein the standard hitch ball, and also has a manually movable lock lever 26 for activating the coupler mechanism to secure the trailer tongue to the hitch ball. This coupler 24 is also a standard and well known structure.

To couple the one-wheel trailer 11 to the rear of the vehicle 12, the hitch arrangement 10 incorporates therein the hitch adapter 31 of this invention. This hitch adapter connects to the above-described hitch bar 16 as attached to the vehicle, and also couples to the trailer couplers 24, as described in greater detail hereinafter.

Referring to FIGS. 3-5, the hitch adapter 31 is, in the preferred and illustrated embodiment, of a generally T-shaped configuration when viewed from above. The adapter 31 includes an elongated connector bar 32 which is substantially Z-shaped when viewed from the side. This connector bar 32 includes substantially planar front and rear portions 33 and 35, respectively, which portions are parallel but laterally offset and are rigidly joined together by an intermediate offset portion 34. The front portion 33 has a pair of rigid, parallel side plates 36 fixed, as by welding, to the opposite side edges thereof, which side plates 36 project downwardly beyond the lower surface of the front portion 33 and co-operate therewith so as to define a downwardly opening channel 37 as illustrated by FIG. 5. This channel 37 is sized so as to snugly accommodate therein the hitch bar 16, as explained hereinafter. The front portion 33 also has a centrally located opening 38 extending vertically therethrough, and an appropriate threaded fastener 39, such as a bolt having a conventional nut and washer associated therewith, is provided for extension through the opening 38.

The hitch adapter 31 also includes a horizontally elongated crossbar 41 which, at the midpoint thereof, is fixedly secured to the rear end of the connector bar 32 so that the elongated direction of the crossbar 41 extends perpendicularly with respect to the elongated direction of the connector bar 32. More specifically, the crossbar 41 at its midpoint is fixedly secured, as by being welded, to the rear portion 35 directly adjacent the free end thereof. Further, the crossbar 41 is preferably positioned so as to overlie the upper surface of the rear portion 35, which rear portion 35 is in turn spaced upwardly from the front portion 33, whereby the crossbar 41 is hence positioned at an elevation spaced a substantial distance above the elevation of the front portion 33.

The crossbar 41 has a pair of conventional hitch balls 42 mounted thereon adjacent the opposite ends thereof. These hitch balls are conventional in that each has a downwardly projecting threaded stud which extends through an appropriate opening 43 formed in the crossbar, so that the hitch ball is hence removably fixed to the crossbar by securement of an appropriate nut on the threaded stud below the crossbar.

OPERATION

When it is desired to haul a single-wheel trailer 11, and assuming that the vehicle 12 has a conventional hitch bar 16 thereon, then the ball 19 is initially removed from the hitch bar. Thereafter the T-shaped hitch adapter 31 is oriented so that the front portion 33 of the connector bar 32 is positioned directly over the hitch bar 16 so that the openings 38 and 18 are aligned. When so positioned, the hitch bar 16 is hence disposed within the downwardly opening channel 37, and the side plates 36 are disposed so that they overlap and snugly confine the side edge surfaces 45 of the hitch bar 16. The bolt 39 is then positioned so as to extend downwardly through the aligned openings 18 and 38, and is fixedly secured by means of the lock washer 47 and nut 48 so that the adapter 31 is hence rigidly secured to the hitch bar 16. Further, the support washer 49 is also preferably positioned under the head of the bolt 39 so as to more uniformly distribute the pressure as applied to the upper surface of the connector bar.

With the adapter 31 fixedly coupled to the hitch bar 16 as described above, the adapter 31 is rigidly coupled to and effectively constitutes a rearward extension of the hitch bar 16 since the close confinement of the hitch bar 16 within the channel 37, coupled with the connection created by the bolt 39, hence provides a strong and rigid connection of the adapter 31 to the hitch bar 16. More specifically, the close confinement of the hitch bar 16 within the channel 37 and between the elongated side plates 36 hence provides substantial torsional resistance both vertically and horizontally. This arrangement thus effectively prevents the adapter 31 from moving or rotating either vertically or horizontally relative to the hitch bar 16.

With the adapter 31 secured to the hitch bar 16 as described above, the adapter 31 hence effectively projects rearwardly beyond the vehicle bumper 17 so that the crossbar 41, and the hitch balls 42 thereon, are thus disposed rearwardly from the vehicle bumper 17. At the same time, this crossbar 41 is positioned at an elevation substantially above the hitch bar 16, and hence is positioned at an elevation similar to or even above the rear bumper 17, whereupon the single-wheel trailer 11 can be suitably coupled to the hitch adapter by means of the two couplers 24 being engaged in a conventional manner with the two hitch balls 42. This higher elevation of the crossbar 41 hence permits the adapter 31 to readily accommodate a single-wheel trailer, inasmuch as such trailer normally has the bed or frame thereof disposed at a substantially higher elevation in order to accommodate the mounting of the single wheel thereunder. Since the trailer has a double coupling with the adapter 31, this thus results in the trailer itself being rigidly coupled to the adapter 31 except that the connection between the couplers 24 and balls 42 will enable the trailer to vertically pivot or articulate about a horizontal axis which extends through the centers of the two balls 42, whereby the trailer can thus pivot upwardly and downwardly as it is towed so as to compensate for elevational changes as the vehicle travels over uneven terrain.

Hence, with the improved hitch arrangement of this invention, and specifically the hitch adapter 31, a single-wheel trailer can be safely and securely connected to a tow vehicle without requiring any special clamps or adapters for attachment to the vehicle bumper. Rather, the hitch adapter can be rigidly coupled directly to a standard hitch bar as is conventionally already fixedly mounted on many existing vehicles. The resulting arrangement, namely with the adapter of this invention rigidly attached to the existing hitch bar, thus enables a single-wheel trailer to be easily and conveniently attached to or detached from a vehicle, and the overall hitch arrangement still provides for the necessary vertical pivoting motion between the car and the trailer so as to negotiate changes in elevation, but at the same time provides a very rigid connection so as to prevent any other type of articulation between the car and trailer.

While the hitch adapter 31 as illustrated and described is, in the preferred embodiment, of a generally T-shaped configuration and is suitably formed from appropriate steel plate, it will be appreciated that the adapter can assume other configurations without departing from the basic invention. For example, the adapter can be triangular when viewed from above, with the apex of the triangle defining the attachment point to the hitch bar and the side legs of the triangle being secured adjacent the free ends of the crossbar. Further, the two balls 42 can be replaced by hinge arrangements which utilize aligned horizontally extending hinge pins so as to provide for the desired vertical articulation between the trailer and vehicle, although use of conventional balls and ball-couplers is preferred because of their recognized availability, convenience of use, and standardized load ratings.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follow:

1. The combination comprising:
   a vehicle having a trailer hitch mounted thereon, said trailer hitch including a hitch bar which is fixed to said vehicle and projects horizontally rearwardly thereof from below the rear vehicle bumper, said hitch bar having an opening extending vertically therethrough in the vicinity of the free rearward end of the hitch bar, said opening normally permitting a conventional hitch ball to be mounted on the hitch bar;
   a trailer having a single wheel mounted thereon for rollingly supporting same, said trailer having a tongue structure projecting forwardly thereof, said tongue structure mounting thereon in sidewardly spaced relationship a pair of conventional ball-receiving couplers; and
   adapter means for coupling said trailer to said hitch bar for solely permitting relative vertical articulation between the trailer and the hitch bar about a substantially horizontal axis which extends perpendicular relative to the direction of vehicle movement;
   said adapter means including a one-piece rigid frame which has a front portion adapted for rigid connection to said hitch bar and a rear portion adapted for connection to said trailer couplers, said frame being T-shaped when viewed from above and including a crossbar which defines said rear portion and a coupling bar which is fixed to said crossbar adjacent the center thereof and projects forwardly therefrom in substantially perpendicular relationship thereto, said coupling bar adjacent the front free end thereof defining said front portion, said front portion having a horizontal plate part with an opening extending vertically therethrough, said horizontal plate part and said hitch bar being disposed vertically one above the other in horizontally overlapping relationship so that the opening in the plate part is aligned with an opening in said hitch bar, and threaded fastener means projecting through said aligned openings for fixedly coupling said plate part and said hitch bar in said overlapping position;

said adapter means having a pair of conventional hitch balls fixedly mounted on and projecting upwardly from said crossbar adjacent the opposite ends thereof for engagement with said trailer couplers; and said front portion having a pair of side parts which are fixedly secured to the opposite sides of said horizontal plate part and project vertically therefrom to define a channel structure which opens vertically, said hitch bar being positioned within and closely confined by said channel-like structure so that said side parts are disposed directly adjacent the opposite side edges of the hitch bar when the latter is disposed in overlapping relationship with said horizontal plate part to prevent horizontal articulation between the frame and the hitch bar.

2. The combination according to claim 1, wherein said coupling bar is substantially Z-shaped when viewed from the side so that the horizontal plate part is disposed at an elevation substantially below the elevation of said crossbar.

* * * * *

UNITED STATES PATENT AND TRADEMARK OFFICE
CERTIFICATE OF CORRECTION

PATENT NO. : 4,426,097

DATED : January 17, 1984

INVENTOR(S) : C. Glenn Livingston

It is certified that error appears in the above-identified patent and that said Letters Patent is hereby corrected as shown below:

On the title page, change the title from "HITCH ADAPTER FOR SINGLE-WHEEL TRAINER" to ---HITCH ADAPTER FOR SINGLE-WHEEL TRAILER---.

Signed and Sealed this

Fifteenth Day of May 1984

[SEAL]

*Attest:*

GERALD J. MOSSINGHOFF

*Attesting Officer*     *Commissioner of Patents and Trademarks*